(12) United States Patent
Sun et al.

(10) Patent No.: US 10,404,344 B2
(45) Date of Patent: *Sep. 3, 2019

(54) SHORT SSW FRAME FORMAT FOR SLS BEAMFORMING PROCESS BETWEEN ENABLED, ASSOCIATED STATIONS, AND METHOD OF PREPARING WIRELESS COMMUNICATION

(71) Applicant: HUAWEI TECHNOLOGIES CO., LTD., Shenzhen (CN)

(72) Inventors: Sheng Sun, Kanata (CA); Yan Xin, Kanata (CA); Kwok Shum Au, Ottawa (CA); Osama Aboul-Magd, Kanata (CA)

(73) Assignee: HUAWEI TECHNOLOGIES CO., LTD., Shenzhen, Guangdong (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/113,638

(22) Filed: Aug. 27, 2018

(65) Prior Publication Data

US 2019/0013852 A1 Jan. 10, 2019

Related U.S. Application Data

(63) Continuation of application No. 15/361,717, filed on Nov. 28, 2016, now Pat. No. 10,063,302.

(Continued)

(51) Int. Cl.
*H04B 7/00* (2006.01)
*H04B 7/06* (2006.01)
(Continued)

(52) U.S. Cl.
CPC ......... *H04B 7/0617* (2013.01); *H04B 7/0695* (2013.01); *H04B 7/088* (2013.01);
(Continued)

(58) Field of Classification Search
CPC .... H04B 7/0617; H04B 7/0695; H04B 7/088; H04W 76/10; H04W 88/02; H04W 88/08
See application file for complete search history.

(56) References Cited

U.S. PATENT DOCUMENTS

| 2015/0244432 A1 | 8/2015 | Wang |
| 2015/0289147 A1* | 10/2015 | Lou .................... H04B 7/0408 370/329 |

(Continued)

FOREIGN PATENT DOCUMENTS

| CA | 2937021 C | 1/2019 |
| EP | 2894927 A1 | 7/2015 |

(Continued)

OTHER PUBLICATIONS

Raj Jain, "Introduction to 60 GHz Millimeter Wave Multi Multi-Gigabit Wireless Networks", Course CSE574S: Wireless and Mobile Networking, Washington University in Saint-Louis, Spring 2014.

(Continued)

*Primary Examiner* — Khai M Nguyen
(74) *Attorney, Agent, or Firm* — Norton Rose Fulbright Canada LLP

(57) ABSTRACT

The AP can generate a distinctive 8 bit value, and fill the 8 most significant bits (MSBs) of the a 16 bit AID field to form a EDMG BSS AID. Beamforming can include a station performing a sector level sweep (SLS) process including transmitting, in sequence, a plurality of short sector sweep (SSW) frames to the other station using corresponding ones of the antenna sectors, and receiving, in sequence, a plurality of the short SSW frames from the other station, the short SSW frames having an addressing field format specifying a receiver address association ID (RA AID) and a transmitter address association ID (TA AID). The distinctive 8 bit value can be used as the AP AID.

25 Claims, 10 Drawing Sheets

Related U.S. Application Data

(60) Provisional application No. 62/331,113, filed on May 3, 2016, provisional application No. 62/323,070, filed on Apr. 15, 2016.

(51) Int. Cl.
  *H04W 76/10* (2018.01)
  *H04B 7/08* (2006.01)
  *H04W 88/02* (2009.01)
  *H04W 88/08* (2009.01)

(52) U.S. Cl.
  CPC ............ *H04W 76/10* (2018.02); *H04W 88/02* (2013.01); *H04W 88/08* (2013.01)

(56) References Cited

U.S. PATENT DOCUMENTS

| | | | |
|---|---|---|---|
| 2016/0105229 A1 | 4/2016 | Trainin et al. | |
| 2016/0329947 A1* | 11/2016 | Jo | H04B 7/0634 |
| 2017/0064583 A1* | 3/2017 | Roy | H04W 36/0005 |
| 2017/0079031 A1 | 3/2017 | Maltsev, Jr. et al. | |
| 2017/0086211 A1 | 3/2017 | Sahin et al. | |
| 2017/0126302 A1* | 5/2017 | Sanderovich | H04W 28/06 |
| 2017/0134145 A1 | 5/2017 | Xin et al. | |
| 2017/0156153 A1 | 6/2017 | Hart et al. | |
| 2017/0201298 A1* | 7/2017 | Cariou | H04B 7/0452 |
| 2017/0264350 A1* | 9/2017 | Sanderovich | H04B 7/0491 |
| 2017/0265122 A1* | 9/2017 | Levy | H04W 8/26 |
| 2019/0068271 A1* | 2/2019 | Lou | H04B 17/12 |

FOREIGN PATENT DOCUMENTS

| | | |
|---|---|---|
| RU | 2580324 C2 | 4/2016 |
| WO | 2014151951 A1 | 9/2014 |

OTHER PUBLICATIONS 802.11 Working Group of the LAN/MAN Standards Committee of the IEEE Computer Society, "IEEE P802.11-REVmcTM/D5.0, Jan. 2016, Draft Standard for Information technology—Telecommunications and information exchange between systems—Local and metropolitan area networks—Specific requirements", Jan. 2016, p. 661 (Section 9.4.1.8 AID field).
Wikipedia, "Birthday problem", https://en.wikipedia.org/wiki/Birthday_problem, Retrieved from Internet on Oct. 3, 2016.
Alecsander Eitan and Carlos Cordeiro, "Short SSW Format for 11ay", https://www.google.ca/url?sa=t&rct=j&q=&esrc=s&source=web&cd=1&cad=rja&uact=8&ved=0ahUKEwi248Wzxb3RAhWFDZoKHWoNCbIQFggaMAA&url=https%3A%2F%2Fmentor.ieee.org%2F802.11%2Fdcn%2F16%2F11-16-0416-01-00ay-short-ssw-format-for-11ay.pptx&usg=AFQjCNHhLoz1_h6YHON0FGZTQ_DSIE7f3A , Mar. 14, 2016.
Qian Chen (I2R): "Spatial Sharing Mechanism in 802.11aj (60GHz New technique proposal), IEEE802.11-14/0009r1",Jan. 8, 2014. pp. 1-17. XP068063594.
Rob Sun (Huawei) et al: "Optimized Short SSW frame with optimzed addressing scheme", IEEE802.11-17/0022-02r1, Jan. 2017, pp. 1-17. XP068112407.
Anonymous: "802.11ad—2012 IEEE Standard for Information, technology—Telecommunications and Information exchange between systems—Local and metropolitan area networks—Specific requirements—Part 11: Wireless LAN Medium Access Control (MAC) and Physical Layer (PHY) Specifications Amendment 3: Enhancements for ver", IEEE Standard, vol. 802.11ad—2012, Dec. 28, 2012. pp. 1-628, XP068045729.
Alecsander Eitan (Qualcomm): "Short SSW Format for 11ay, IEEE802.11-16/0416-01-00", IEEE Draft, Mar. 2016. pp. 1-11. XP068105335.

* cited by examiner

| COLUMN1 | n=2 | n=4 | n=8 | n=16 | n=32 | n=64 | b |
|---|---|---|---|---|---|---|---|
| m=16 | 0.00% | 0.01% | 0.05% | 0.20% | 0.78% | 3.13% | 1 |
| m=16 | 0.01% | 0.04% | 0.15% | 0.59% | 2.34% | 9.38% | 2 |
| m=16 | 0.02% | 0.06% | 0.24% | 0.98% | 3.91% | 15.63% | 3 |
| m=16 | 0.02% | 0.09% | 0.34% | 1.37% | 5.47% | 21.88% | 4 |
| m=16 | 0.03% | 0.11% | 0.44% | 1.76% | 7.03% | 28.13% | 5 |
| m=16 | 0.03% | 0.13% | 0.54% | 2.15% | 8.59% | 34.38% | 6 |
| m=16 | 0.04% | 0.16% | 0.63% | 2.54% | 10.16% | 40.63% | 7 |
| m=16 | 0.05% | 0.18% | 0.73% | 2.93% | 11.72% | 46.88% | 8 |
| m=16 | 0.05% | 0.21% | 0.83% | 3.32% | 13.28% | 53.13% | 9 |
| m=16 | 0.06% | 0.23% | 0.93% | 3.71% | 14.84% | 59.38% | 10 |

FIG. 9A

| COLUMN1 | n=2 | n=4 | n=8 | n=16 | n=32 | n=64 | b |
|---|---|---|---|---|---|---|---|
| m=16 | 0.00% | 0.00% | 0.00% | 0.00% | 0.00% | 0.00% | 1 |
| m=16 | 0.01% | 0.02% | 0.10% | 0.39% | 1.56% | 6.25% | 2 |
| m=16 | 0.01% | 0.05% | 0.20% | 0.78% | 3.13% | 12.50% | 3 |
| m=16 | 0.02% | 0.07% | 0.29% | 1.17% | 4.69% | 18.75% | 4 |
| m=16 | 0.02% | 0.10% | 0.39% | 1.56% | 6.25% | 25.00% | 5 |
| m=16 | 0.03% | 0.12% | 0.49% | 1.95% | 7.81% | 31.25% | 6 |
| m=16 | 0.04% | 0.15% | 0.59% | 2.34% | 9.38% | 37.50% | 7 |
| m=16 | 0.04% | 0.17% | 0.68% | 2.73% | 10.94% | 43.75% | 8 |
| m=16 | 0.05% | 0.20% | 0.78% | 3.13% | 12.50% | 50.00% | 9 |
| m=16 | 0.05% | 0.22% | 0.88% | 3.52% | 14.06% | 56.25% | 10 |

FIG. 9B

LEGEND  ◇: HASHED ADDRESS SCHEME
□: 16BITS DUAL AID SCHEME

SHORT SSW FRAME FORMAT FOR SLS BEAMFORMING PROCESS BETWEEN ENABLED, ASSOCIATED STATIONS, AND METHOD OF PREPARING WIRELESS COMMUNICATION

CROSS-REFERENCE TO RELATED APPLICATIONS

This application is a continuation of U.S. patent application Ser. No. 15/361,717, filed on Nov. 28, 2016, which claims benefit, including priority, of: U.S. Provisional Patent Application No. 62/323,070 filed Apr. 15, 2016 by applicant, and U.S. Provisional Patent Application No. 62/331,113 filed May 3, 2016 by applicant. All of the above-noted applications are hereby incorporated by reference in their entireties.

FIELD

The improvements generally relate to the field of wireless communication networks, and more specifically to directional communication protocols in the 60 GHz millimetre wave band.

BACKGROUND

Wireless communications networks, such as wireless LANs, can allow network-enabled stations (STAs) to access a network, via an access point (AP) by communicating wirelessly. The access point (AP) is typically also considered an STA.

Standard-setting organizations provide standards by which devices from various manufacturers can communicate with one another.

The IEEE 802.11 standard governs wireless connectivity in local area networks. IEEE 802.11 specifies a basic service set (BSS) 10 as consisting of a single AP 12 with one or more associated STAs (A-STA) 14, 14', as illustrated in FIG. 1. An example STA 20 is schematized in FIG. 2 and can be seen to have one or more processor(s) 22, memory 24, and one or more radio(s) 26, with each radio 26 typically having a transmitter 28, a receiver 30, and one or more antenna(e).

Accordingly, each STA 14, 14' can have a uniquely addressable medium access control (MAC) and a physical layer (PHY) interface to the wireless medium (WM). IEEE includes specification that functions to associate an enabled STA 14 and the AP 12 thereby causing the enabled STA 14 to become an associated STA (A-STA). During this process, IEEE 802.11 defines a receiver address (RA) and a transmitter address (TA) for the MAC frame header. IEEE also includes specifications for dealing with BSS's having overlapping ranges (which can be referred to as OBSS—not illustrated).

More specifically, amendment IEEE 802.11ad-2012, referred to as IEEE 802.11ad, addresses the use of wireless in the 60 GHz "millimeter" wave band, a band which is unlicensed globally, thus making it available for use in local area networks (LANs). In particular, communication in the 60 GHz band, although directional and strongly attenuated (short range), is perceived as having a strong potential for replacing cabled connections (e.g. Ethernet) and providing multi-gigabit transmission speeds.

Under IEEE 802.11ad, wireless communications between stations have a format which can be referred to as the beacon interval (BI) 40. FIG. 3 schematizes the BI 40. The BI 40 can be seen to generally include a beacon transmission interval (BTI) 42, an associating beamforming training (A-BFT) 44, and a data transmission interval (DTI) 46. The BTI 42 is used for AP discovery purposes and, more specifically, for AP-side sector sweep transmit antenna beamforming training purposes. The A-BFT 44 can be used mainly for STA-side sector sweep transmit antenna beamforming training purposes. The DTI 46 can be used for further beamforming training and for data communication. The BI 40 can further include additional intervals, such as an announcement transmission interval (ATI) (not shown), which can immediately precede the DTI 46, for instance.

Under IEEE 802.11ad, STA's 14, 14' can be referred to as directional multi-gigabit (DMG) STA's, and the beacon can be referred to as the DMG beacon. Under IEEE 802.11ad, APs 12 are sometimes referred to as personal BSS (PBSS) control points, (PCPs). Both expressions will be used interchangeably in this specification.

DMG communications typically involve STA's having a plurality of antenna sectors. The different antenna sectors offer different performance in different directions. IEEE 802.11ad includes beamforming (BF) specifications which refer to a process by which the directional link is 'trained' to meet the required link budget. These specifications include a sector level sweep (SLS) process 50 such as shown in FIG. 4. The station initiating the SLS 50 is referred to as the initiator, and the other station is referred to as the responder. During SLS 50, different combinations of initiator antenna sectors and responder antenna sectors are tested to find a satisfactory combination. More specifically, in a first phase of the SLS, sector sweep (SSVV) frames 52, (sometimes alternatively referred to as BF frames) are emitted sequentially by the different sectors of the initiator antenna. The first phase of SLS can be conducted during a beacon transmission interval (BTI) 42 portion of the BI 40, for instance.

In a second phase of the SLS 50, the responder transmits SSW frames 54 sequentially through its different antenna sectors. The SSW frames 54 emitted by the responder include feedback pertaining to the strength of the signals received from the different sectors of the initiator. The second phase of the SLS 50 can be performed during an A-BFT 44 or DTI 46 of the BI 40, for instance.

In a third phase, the initiator can transmit SSW feedback (SSW-FB) 56 to the responder. The SSW-FB indicates the strength of the signals received from the responder's different antenna sectors and the selected sector and antenna.

In a fourth phase, the responder can send an acknowledgement of the SSW-FB 58. The SLS process 50 can determine combination of sectors functional to enable efficient directional communication.

The SLS process 50 is typically followed by a beam refinement procedure (BRP) which can search to find optimal parameters for a given sector combination. Beam tracking can be performed to check and attempt to correct signal quality during data transfer. The standard SSW frame 60 defined at 8.3.1.16 of 802.11ad is depicted in FIG. 5 and has 26 Bytes.

Since the SSW frame 60 is repeatedly used by both initiator and responder during SLS 50, the side of the field (i.e. the number of bits) is directly related to bandwidth usage. It is therefore desirable that the SSW frame format 60 be limited in size while maintaining its functionality and, to a certain extent, account for eventual evolution of the standard. In the case of IEEE 802.11ad, when the AP 12 is the initiator and an associated STA 14 is the responder, several fields of the SSW frame 60 were left unused. There thus remained room for improvement.

Document IEEE 802.11-16/0416-01-00, entitled Short SSW Format for 11ay, was submitted Mar. 14, 2016. This submission occurred in the context of the 11ay amendment which aimed to build upon 11ad. This document proposes providing a short SSW frame 65 capability which can be used instead of the 11ad standard SSW frame 60 when both stations are determined to support it. Under 11ay, STAs 12, 14, 14' having a radio transmitter capable of transmitting and receiving enhanced DMG (EDMG) physical layer (PHY) protocol data units (PPDUs) are provided. Accordingly, this short SSW frame capability may require that both STAs undergoing the SLS be EDMG STA's. The short SSW format 65 proposed in this document is presented in FIG. 6 and has 6 Bytes. The proposed short SSW frame format 65 can be described as the standard SSW frame format 60 with several fields compressed or removed.

Indeed, the non-short SSW frame format 60 includes the receiver address 62 (48 bits), and the transmitter address 64 (48 bits). The proposed short SSW frame format 65 includes a 16 bit addressing field 66 to replace the 96 bits of the non-short SSW frame format 60. It will be noted that this proposal does not define the addressing field format 66 for the short SSW format.

While existing protocol and submissions concerning the 60 GHz wave band were satisfactory to a certain degree, there remains room for improvement.

SUMMARY

In accordance with one aspect, there is provided an addressing field format for the short SSW frame format in 11ay. The addressing field format 68 is illustrated in FIG. 7, and specifies using the 8 bit receiver address association ID (RA AID) adjacent to the 8 bit transmitter address association ID (TA AID). The addressing field format 68 can be used to fill the 16 bit addressing field 66 of the short SSW frame format 65 proposed in Document IEEE 802.11-16/0416-01-00.

In at least some scenarios, the addressing field format 68 can reduce the probability of collision compared to, for example, filling the 16 bit field using a hashing scheme.

Under 11ad, the AP's AID was set to zero. The STA's AID was assigned by the AP, and could be communicated from the AP to the STA (e.g. during the process of association). The STA AID could be communicated via an capability information element during BTI, for instance. An example capability information element 70 is presented in FIG. 8A. The example capability information element 70 can be seen to have an association ID (AID) field 72 totaling 16 bits. This association ID field 72 was intended for use as an A-STA AID field. Only the 8 LSBs 74 of the 16 bit AID field 72 were used to this end, the 8 MSBs 76 were reserved for EDMG, and set to zero. In some alternate scenarios it is possible to communicate the STA AID in an operation information element.

When performing SLS in overlapping BSS (OBSS), there was a given false positive probability associated with scenarios where all AP AIDs were the same (e.g. set to zero). It was found that by assigning a distinctive AID to each AP, this false positive probability could be reduced, at least in some scenarios.

In accordance with another aspect, there is provided a method by which a distinctive association ID can be used for the AP. This association ID can be distinctive. More specifically, the AID can be distinctive by having at least a significant probability of not being the same for all APs operating in a given OBSS. In this manner false positive probability can be reduced when operating in OBSS, compared to, say, a scenario where all APs have the same AID. The method can include directing the AP to assign a distinctive AID to itself. For example, this process may involve having the AP generate an AID and storing it in a given field within the memory of the AP. The AP AID can be randomly generated, or generated using a coloring scheme, for instance. Alternately, a distinctive portion of an existing ID can be copied for use as the AP AID. For instance, a distinctive portion of the 48 bits of the BSS ID, such as the 8 MSBs or the 8 LSBs for instance, can be copied for use as the AP AID. The AP AID can be communicated from the AP AID to a STA over the wireless medium. The STA can receive the AP AID from the AP and store it in a memory of the STA.

It was found that at least in some scenarios, it was possible to communicate the distinctive AP AID from the AP to the STA by including the 8 bits of the AP AID as the 8 MSBs of a 16 bit AID field. For instance, the AP AID can be included as the 8 MSBs of the 16 bit AID field 82 of the capability information element 80 shown in FIG. 8B. Accordingly, the capability information element 70 can be modified to include the AP AID. In such a scenario, the AP AID can be referred to as the EDMG BSS AID 78, and both expressions can be used interchangeably at least in some embodiments. In other words, the AP AID intended for use in SLS can be used as the EDMG BSS AID, including for any suitable uses other than SLS. Moreover, in such a scenario, the capability information element can be referred to as a EDMG capability information element 80, for instance. In some scenarios it is possible to communicate the distinctive AP AID in a field of another element, for example, the operation information element.

The EDMG capability information element 80 can be transmitted from the AP to the STA during ATI or DTI of the BI, for instance. The EDMG BSS AID 78 can be communicated by the AP to another STA during the process of association, for example by making it part of the beacon. The EDMG BSS AID 78 can be communicated to another STA together with the STA's AID 74. This can be accomplished using the 8 MSBs of a 16 bit AID field for the AP AID/EDMG BSS AID 78 and the 8 LSBs of the 16 bit AID field for the STA AID 74, for instance. In some embodiments, the 16 bit AID field can be communicated from the AP to the STA in a separate management frame than the capability information element if found suitable.

During use, these 8 MSBs of the 16 bit AID field format can be filled by the AP in a memory of the AP, most likely to a non-zero value, and later used by the AP. The STA can receive the EDMG BSS AID from the AP and store it in the memory of the STA. The STA can then use the EDMG BSS AID as an AP AID during SLS or for other uses. This EDMG BSS AID can be non-zero, and can be set in a manner to reduce false positive probability when operating in OBSS. The EDMG BSS AID can be a distinctive value randomly generated by the AP, or generated by the AP using a coloring scheme or another suitable scheme, or defined by the AP by copying a distinctive portion of an existing ID, such as a BSS ID, for instance. The AP AID can be used as a EDMG BSS AID or vice versa, and both expressions can be equivalents in some embodiments.

In accordance with one aspect, there is provided a station having a processor, a memory and a radio. The station is enabled for beamforming with another station using a sector level sweep process (SLS). The SLS process includes transmitting and receiving a sector sweep (SSVV) frame to and from the other station using different combinations of antenna sectors. The station is capable of using a short SSW frame as said SSW frame. The short SSW data frame having an addressing field format specifying a receiver address association ID (RA AID) and a transmitter address association ID (TA AID).

The RA AID and the TA AID can each have 8 bits and can be adjacent to one another in the short SSW frame.

The station can be user equipment (UE), wherein the UE is configured to receive an address association ID (STA AID) upon association with an access point (AP), and to use the STA AID as one of the RA AID and the TA AID depending on whether the UE is receiving or transmitting, respectively, during a given step of the SLS process.

The UE can be further configured to receive an AP address association ID (AP AID) upon said association with said access point, and to use the AP AID as the other one of the RA AID or TA AID when performing the SLS process with the AP.

The user equipment can be a mobile device.

The station can be an access point (AP), wherein the AP is configured to assign a distinctive AP address association ID (AP AID) to itself, to communicate the distinctive AP AID, and to use the AP AID as the RA AID or the TA AID depending on whether the AP is receiving or transmitting, respectively, during a given step of the SLS process.

The AP AID can be randomly generated by the AP.

The AP AID can be generated by the AP using a hashing scheme.

The hashing scheme can be a coloring scheme based on a BSS ID of the AP.

The AP can be configured to store the AP AID as the 8 MSBs of a BSS AID of the AP.

The AP can be configured to assign an address association ID (STA AID) to the other station during a process of association, to communicate the AP AID to the other station during the process of association, and to use the STA AID as the other one of the RA AID and the TA AID when performing SLS with the other station.

The station can be configured to use a non-short SSW frame as said SSW data frame wherein use of said short SSW frame can be contingent upon whether the other station possesses short SSW frame capability.

The station can be an EDMG station, and enabling short SSW frame capability in the other station can be contingent on whether the other station can function as an EDMG station.

The short SSW frame format has 6 bytes and includes, in sequence, 2 bits for packet type, 8 bits for RA AID, 8 bits for TA AID, 11 bits for CDOWN, 2 bits for RF chain ID, 11 bits for short SSW feedback, 1 bit for direction, 1 bit reserved, and 4 bits for FCS.

In accordance with another aspect, there is provided a process of beamforming between a station having a plurality of antenna sectors and another station. The station performs a sector level sweep (SLS) process. The SLS process includes transmitting, in sequence, a plurality of short sector sweep (SSVV) frames to the other station using corresponding antenna sectors. The SLS process also includes receiving, in sequence, a plurality of the short SSW frames from the other station. The short SSW frames have an addressing field format specifying a receiver address association ID (RA AID) and a transmitter address association ID (TA AID).

The process can further include, subsequently to the receiving step described above, determining the AID of the other station based on a comparison of one of the RA AID and the TA AID with a previously attributed AID of the station.

The station can be a non-AP station, and the other station can be also a non-AP station, wherein both the non-AP station and the other non-AP station are associated with an AP station in a basic service set (BSS).

The RA AID and the TA AID each have 8 bits and are adjacent to one another in the short SSW format.

The station can be a user equipment and the other station can be an AP. The process can further include, prior to performing the SLS process, the user equipment receiving a station address association ID (STA AID) upon association with the access point (AP), and using the STA AID as the RA AID or the TA AID depending on whether the user equipment is receiving or transmitting, respectively, during a given step of the SLS process.

The process can further include the user equipment receiving an AP address association ID (AP AID) upon said association, and using the AP AID as the RA AID or TA AID, as may be required, when performing the SLS process with the AP.

The other station can receive the AP AID in the form of an EDMG BSS AID within an EDMG Capability information element.

The other station can receive the AP AID in an 8 bit field provided immediately adjacent to an 8 bit field of the STA AID.

The other station can receive the AP AID during association with the AP.

The other station can receive the AP AID during beamforming.

The other station can receive the AP AID during a beacon transmission interval.

The station can be an access point (AP). The process can further include, prior to performing the SLS process, the AP assigning a distinctive address association ID (AP AID) to itself, and using the AP AID as the RA AID or the TA AID depending on whether the AP is receiving or transmitting during a given step of the SLS process.

The process can further include the AP randomly generating the AP AID and storing the AP AID in a field of the AP AID in memory.

The process can further include the AP generating the AP AID using a hashing scheme and storing the AP AID in a field of the AP AID in memory.

The hashing scheme can be a coloring scheme based on a BSS ID of the AP.

The process can further include the AP copying a distinctive portion of a BSS ID in a field of the AP AID in memory.

The process can further include, prior to performing the SLS, the AP assigning an address association ID (STA AID) to the other station and communicating the AP AID to the other station, The process can further include the AP using STA AID the STA AID as the RA AID or the TA AID, as may be required, when performing SLS with the other station.

The process can further determine that the other station can be enabled with short SSW frame capability and select the short SSW frame format instead of non-short SSW frame format in order to perform the SLS process with the other station.

The station can be an EDMG station, and enablement of short SSW frame capability in the other station can be contingent upon whether the other station can also be an EDMG station.

The short SSW frame format can have 6 bytes and includes, in sequence, 2 bits for packet type, 8 bits for RA AID, 8 bits for TA AID, 11 bits for CDOWN, 2 bits for RF chain ID, 11 bits for short SSW feedback, 1 bit for direction, 1 bit reserved, and 4 bits for FCS.

In accordance with one aspect, there is provided a process of preparing communication between an access point (AP) and another station, the AP having a 16 bit association ID (AID) field stored in a memory, with the 8 least significant bits (LSBs) of the 16 bit AID field being for use as the AID of the other station (STA AID), the process comprising : the AP filling the 8 most significant bits (MSBs) of the 16 bit AID field with a distinctive 8 bit value.

The step of filling the 8 MSBs of the 16 bit AID field can include editing a zero value to the distinctive value of the AP AID.

The process can further include the AP randomly generating the distinctive 8 bit value of the AP AID.

The process can further include the AP generating the 8 bit value of the AP AID using a hashing scheme.

The hashing scheme can be a coloring scheme based on the BSS ID.

The step of filling the 8 MSBs of the 16 bit AID field includes copying a distinctive consecutive 8 bit portion of a 48 bit basic service set ID stored in the memory.

The process can further include the AP communicating the 16 bit AID field to the other station.

The step of communicating can be performed in the context of a step of associating the other station to the BSS.

The step of communicating can be performed in the context of a beacon transmission interval.

The step of communicating can include communicating the 16 bit AID field together with a station address association ID (STA AID).

The step of communicating can include communicating the 16 bit AID field in an EDMG Capability information element.

The EDMG Capability information element can have 1 byte for Element ID, 1 byte for length, 6 bytes for STA address, 1 byte for EDBG BSS AID; 1 byte for AID, 8 bytes for EDMG STA Capability information and 2 Bytes for EDMG PCP/AP Capability information.

The step of communicating can include communicating the 16 bit AID field over a DMG beacon.

The step of communicating can include communicating the 16 bit AID field in an Association or Reassociation Response Frame.

The step of communicating can include communicating the 16 bit AID field in a Grant Acknowledgement Frame.

The step of communicating can include communicating the 16 bit AID field in a Probe Response Frame.

The step of communicating can include communicating the 16 bit AID field in an information element.

The information element can be an Extended Scheduling Element, a Multiple BSSID Element, a Nontransmitted BSSID capability element, and/or a DMG BSS Parameter Change element.

The step of communicating can include communicating the 16 bit AID field by including it in a management frame.

The process can further include the AP performing a sector level sweep (SLS) process including transmitting, in sequence, a plurality of short sector sweep (SSW) frames to the other station using corresponding ones of the antenna sectors, and receiving, in sequence, a plurality of the short SSW frames from the other station, the short SSW frames having an addressing field format specifying a receiver address association ID (RA AID) and a transmitter address association ID (TA AID), and the AP using the EDMG BSS AID as the RA AID or the TA AID depending on whether the AP is receiving or transmitting, respectively, during a given step of the SLS process.

The process can further include, prior to performing the SLS, the AP assigning an address association ID (STA AID) to the other station and communicating the AP AID to the other station.

The process can further include the AP using STA AID as either the RA AID or TA AID, as may be required, when performing SLS with the other station.

In accordance with one aspect, there is provided a process of preparing communication between an access point (AP) and another station. In the process the AP has a 16 bit association ID field stored in a memory, with the 8 least significant bits (LSBs) of the 16 bit AID field being a distinctive value for use as the AID of the other station (STA AID). Further, the 8 most significant bits (MSBs) of the 16 bit AID field are a distinctive 8 bit value for use as the AID of the AP (AP AID). The process may comprise : the other station receiving the 16 bit AID field from the AP .

The other station can receive the 16 bit AID in an EDMG Capability information element. The AP AID can be provided in the form of an EDMG BSS AID within the EDMG Capability information element.

The other station can receive the 16 bit AID in the context of association with the AP.

The other station can receive the 16 bit AID during beamforming.

The other station can receive the 16 bit AID during a beacon transmission interval.

Many further features and combinations thereof concerning the present improvements will appear to those skilled in the art following a reading of the instant disclosure.

DESCRIPTION OF THE FIGURES

In the figures,

FIG. 9A and 9B are tables listing calculations of false positive probability for various quantities of overlapping BSSs with varying quantities of stations per BSS, with FIG. 9A presenting a hashed addressing field format and FIG. 9B presenting a dual AID addressing field format;

DETAILED DESCRIPTION

Figure 1:
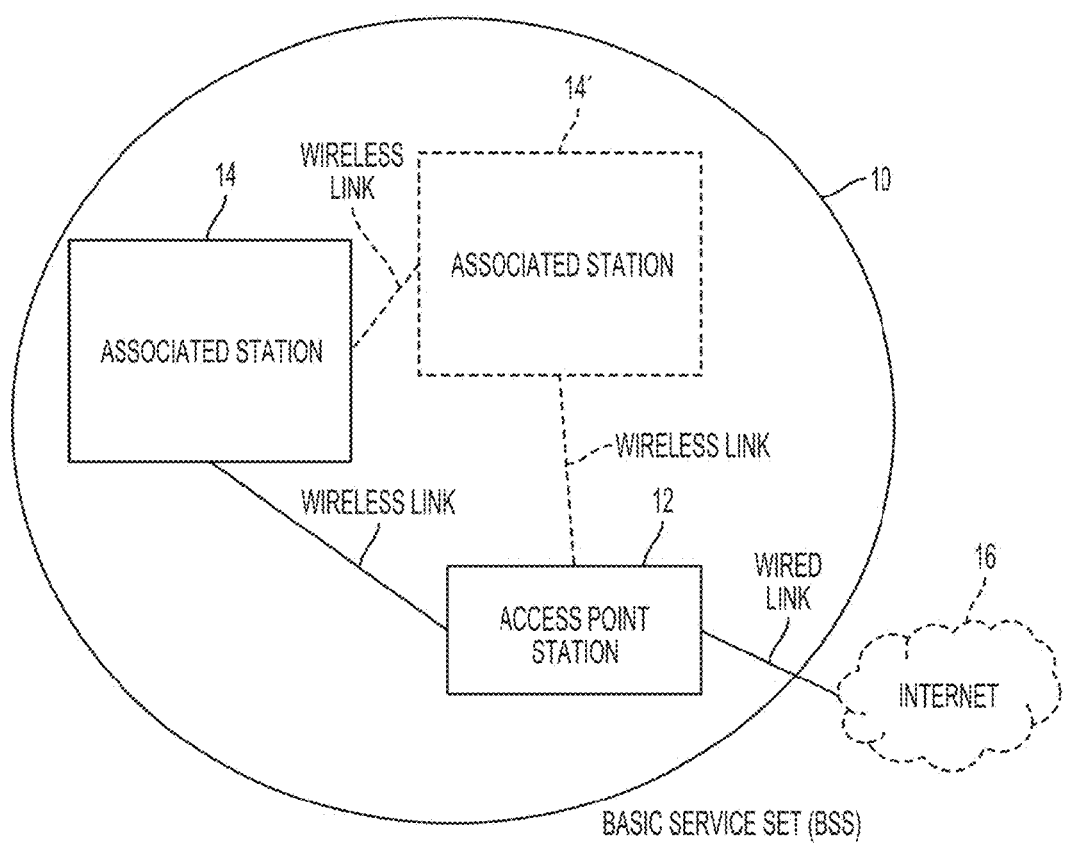
FIG. 1 is a schematic view showing a basic service set (BSS) in accordance with the prior art.

FIG. 1 shows an example of a basic service set (BSS) 10 which can have two or more stations (STAs) 12, 14, 14'. STAs 12, 14, 14' may be capable of communicating wirelessly with one another in the 60 GHz band, for example for directional multi-gigabit (DMG) wireless communication. One of the stations 12, 14, 14' in FIG. 1 is an access point (AP) 12, which can alternately be referred to as a PBSS control point (PCP) under 802.11ad. The other stations are non-AP STAs 14, 14'.

Prior to being allowed to communicate with other stations 12, 14' within the BSS 10, a non-AP STAs 14 must perform an association process with the AP 12; a process during which the non-AP STA 14 is assigned an association ID (AID). In some embodiments, the AP 12 is permanently associated. Accordingly, the AP does not necessarily have an AID when SLS is initiated. The AP 12 can be configured to assign an AID to itself as will be detailed below.

The non-AP stations 14, 14' can take different forms, collectively described as User Equipment (UE), and can be mobile devices such as a laptop, a tablet or hand-held devices such as a smartphone, PDA, etc. The non-AP stations 14, 14' can also be connected objects such as a watch, television, video game console, controller, intelligent lock system, or other devices in the realm of the Internet of things (IOT). Once associated, the non-AP stations 14, 14' can have access to the Internet 16 via the AP 12, or be allowed to communicate with one another and form a network, for instance.

Figure 2:
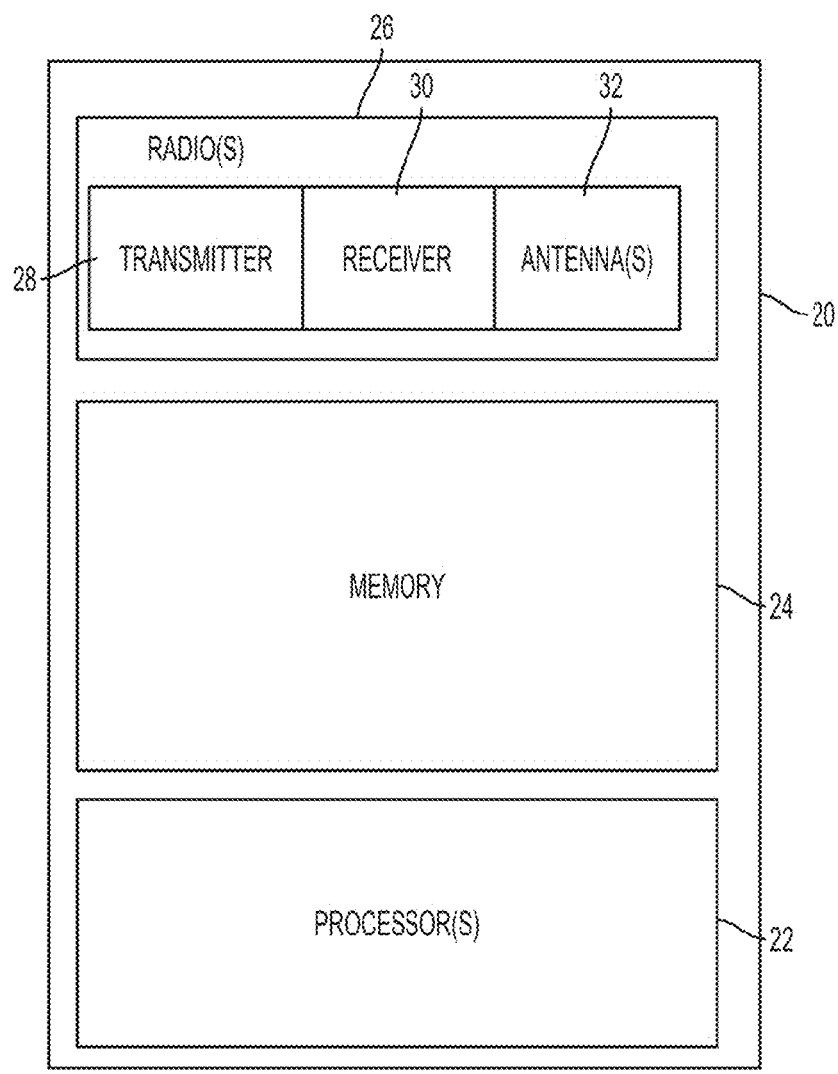
FIG. 2 is a schematic view of a station which can be enabled for use as an associated station or an access point station in the BSS of FIG. 1, in accordance with the prior art.
Figure 3:
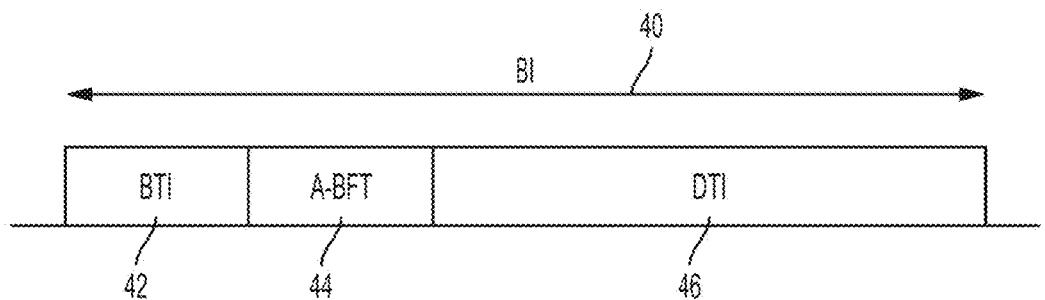
FIG. 3 is a schematic view of a beacon interval format which can be used in wireless communications between stations of a BSS, in accordance with the prior art.

FIG. 2 shows an example of a station 20 which is enabled for communication in a wireless manner. The station 20 generally has one or more processors 22, memory 24, and one or more radio systems 26. A radio system typically includes a transmitter subsystem 28 and a receiver subsystem 30 connected to one or more antennas 32. Typically, a station enabled for direct multi-gigabit (DMG) wireless communication in the 60 GHz band will have more than one antenna sector, and the wireless connection will be trained by a beamforming process.

Figure 4:
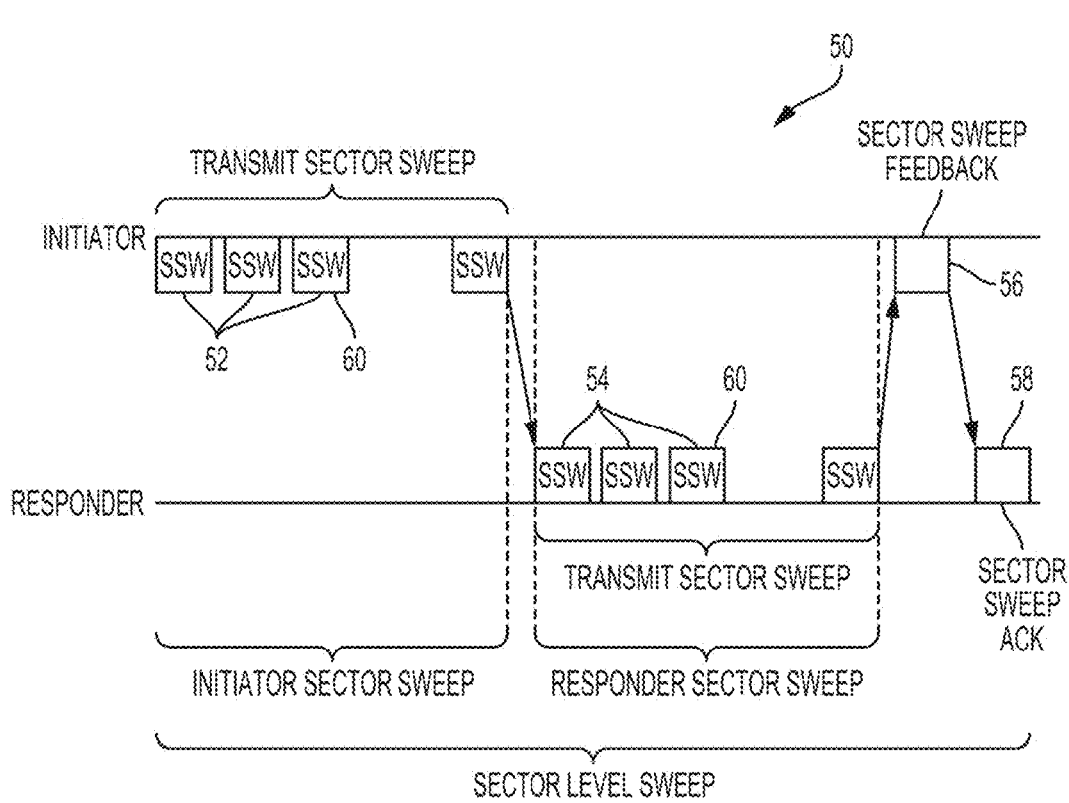
FIG. 4 is a schematic view of a sector level sweep (SLS) process which can be used for beamforming between two stations communicating wirelessly within a BSS, in accordance with the prior art.
Figure 5:
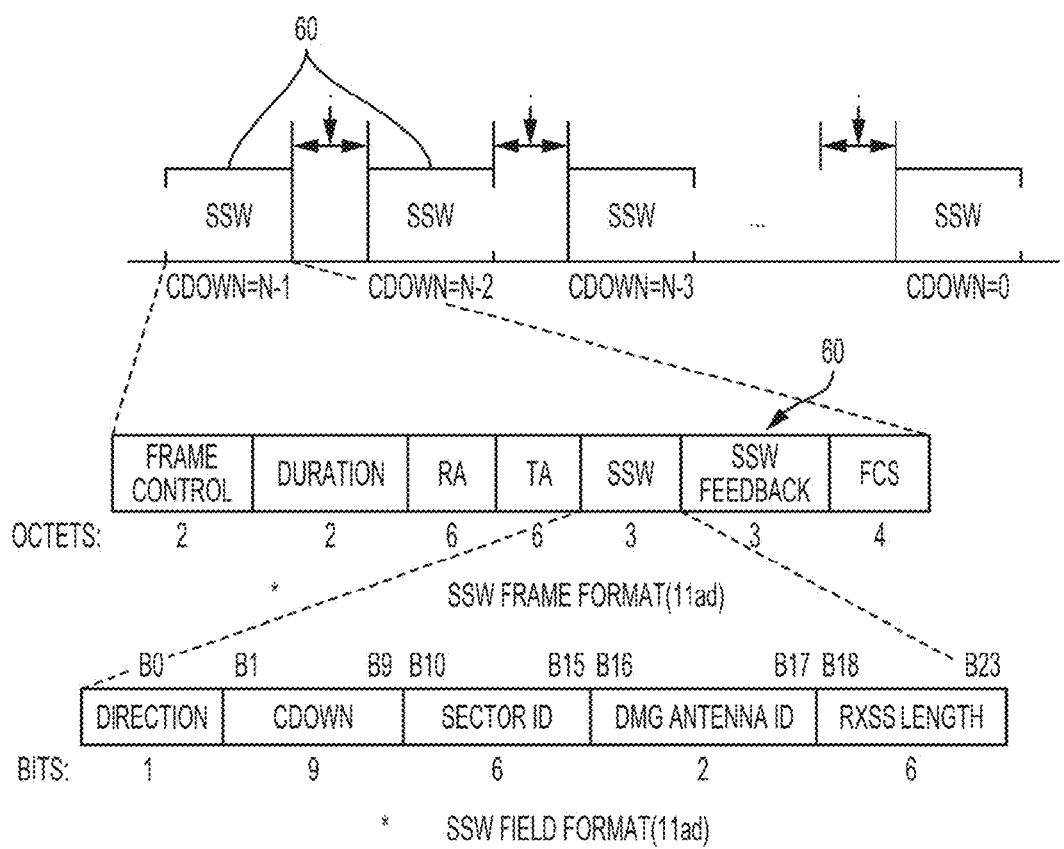
FIG. 5 is a schematic view showing the sector sweep (SSVV) frame format for use in SLS as defined under IEEE 802.11ad, in accordance with the prior art.
Figure 6:
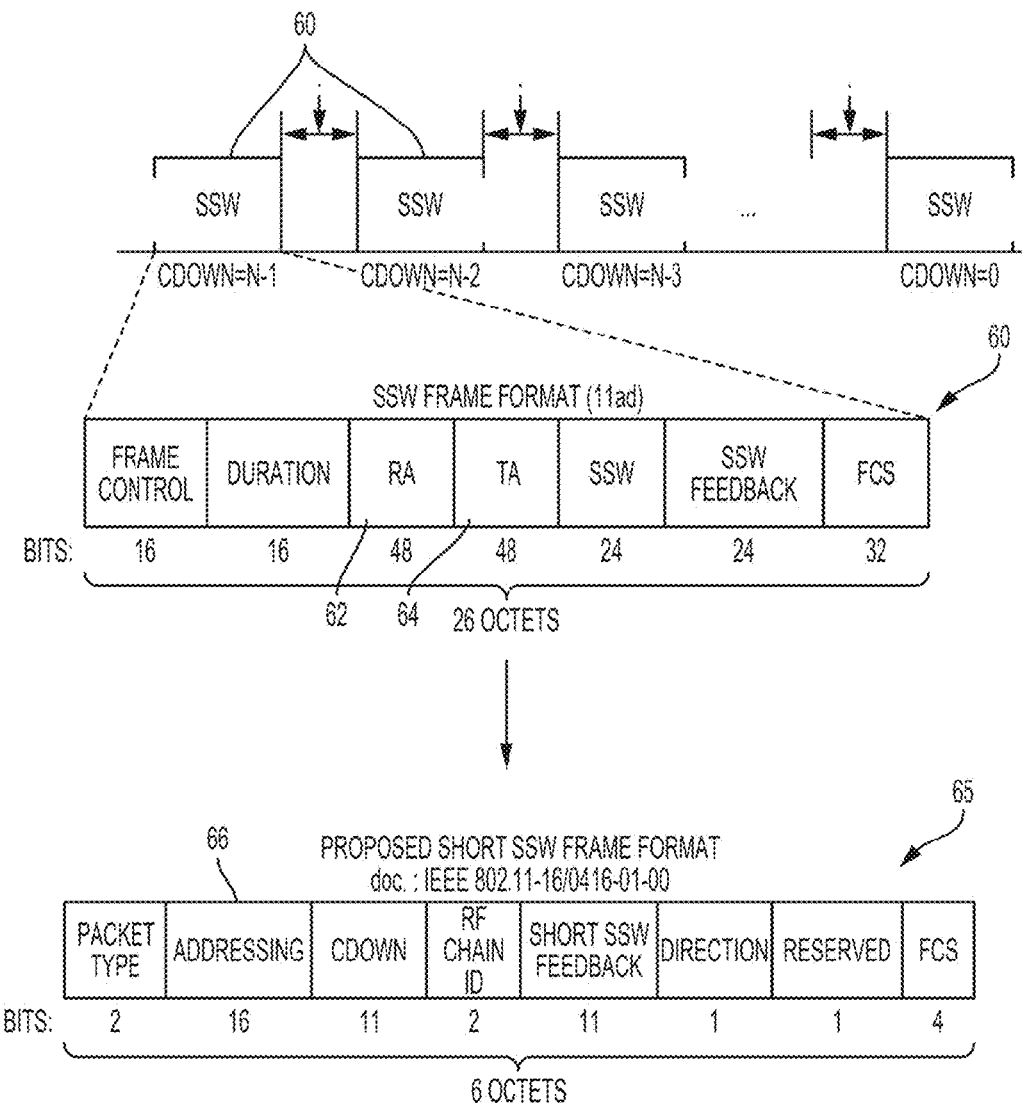
FIG. 6 is a schematic view showing a proposed short SSW frame format in accordance with the prior art, with an unspecified addressing field format.

Under IEEE 802.11ad, the beamforming process includes a sector level sweep process (SLS) 50, schematized in FIG. 4, which allows the two communicating stations to select a favorable combination of antenna sectors. One of the two stations will act as the initiator and begin transmitting the sequence of sector sweep (SSVV) frames 52 which are received by the other station which acts as the responder. After this initial phase, the responder transmits a sequence of SSW frames 54 which are received by the initiator. In many instances, the AP acts as the initiator, but this is not always the case; SLS can be initiated between other combinations of stations within the BSS.

An AP or non-AP station can be enabled for short SSW frame SLS by having appropriate computer readable instructions stored in its memory 24. The computer readable instructions can be executable by the processor(s) 22 and can include MAC and PHY specifications for performing steps of the SLS process 50 such as generating the SSW frames 60. The computer readable instructions can include the addressing field format 68 of the short SSW frame format 69.

Short SSW frames 69 can be particularly useful in applications where one, or both, of the stations have massive array antenna configurations. Under 802.11ay, stations will retain the ability to use 802.11ad SSW frames 60, which will be referred to herein as non-short SSW frames for clarity. A determination of whether or not short SSW frames 69 can be used can be made by the stations 12, 14, 14' and can be contingent upon factors such as whether or not both devices are short SSW enabled. In particular, enhanced DMG (EDMG) stations can be enabled for short SSW frames under 802.11ay.

One of the challenges in the selection of an addressing field format is dealing with the false positive probability (likelihood of collision) in the context of an overlapping basic service set (OBSS) environment.

Figure 7:
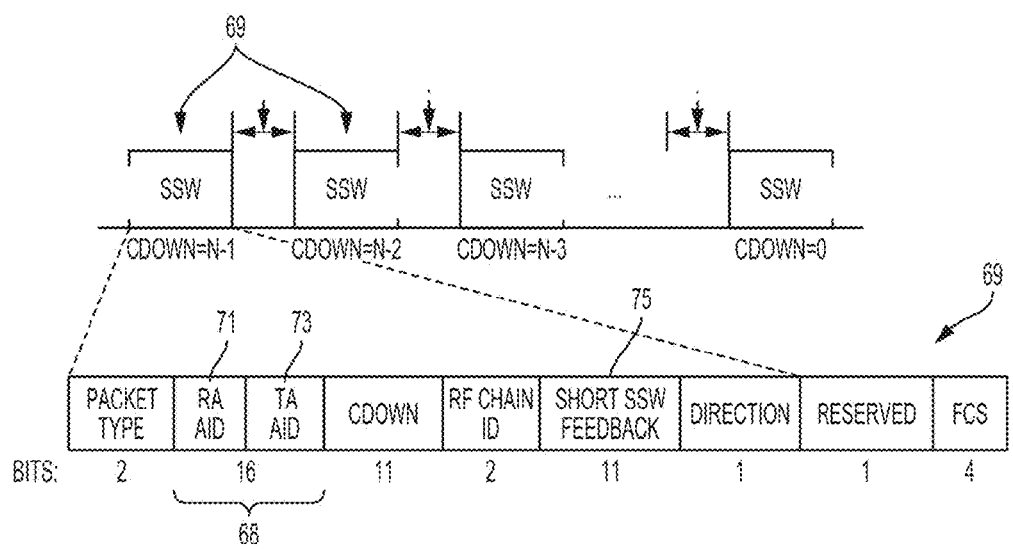
FIG. 7 is a schematic view of short SSW frame format with a dual AID addressing field format, for use under IEEE 802.11ay.

An addressing field format 68 proposed for use in the context of short SSW frame format 69 is shown in FIG. 7. The addressing field format 68 includes, the receiver address AID (RA AID) 71 and the transmitter address AID (TA AID) 73. The AID's of the two communicating stations can be used in the RA AID and the TA AID field during SLS 50. For instance, the initiator's AID can be used in the RA AID or the TA AID field depending on whether the initiator is receiving or transmitting during a given phase of SLS. The addressing field format can have a total of 16 bits, and the RA AID and the TA AID can both have 8 bits and be adjacent to one another. In this embodiment, the RA AID is the 8 MSBs of the 16 bit addressing field format 68, and the TA AID is the 8 LSBs of the 16 bit addressing field format 68

If the AP 12 is the receiver or the transmitter, and does not have an AID, it can assign an AID to itself prior to undergoing the SLS process 50.

The false positive probability within a (P)BSS can be based on the "Birthday problem", an example well known in probability theory that in a set of randomly chosen people, some pair of them will have the same birthday. Indeed, the probability can be based on:

$$p(n, H) \approx 1 - e^{-n(n-1)/(2H)} \approx 1 - e^{-n^2/(2H)} \approx n^2/(2h) \qquad (1)$$

Where n denotes number of STAs per BSS, H equals to $2^m$, where m denotes number of bits.

Lemma 1: the false positive probability in OBSS (b>=2), for hashed address for OBSS with equal number of STAs per BSS, is calculated as $$p(n, b, H) \approx ((b*n)^2 - ((b-1)*n)^2)/(2H) = (2b-1)*n^2/2H \qquad (2)$$

Where the b denotes the number of BSS, namely the OBSS.

Lemma 2: The false positive for dual AID calculation within OBSS with equal number of STAs is as:

$$p(n, b, H) \approx (b-1)*n^2/H \qquad (3)$$

Assuming p<1% is the good false positive rate which is equivalent of packet error rate (PER)<10^(-2).

False positive calculations based on the above were performed for: i) the RA AID and TA AID addressing scheme (16 bit dual AID scheme); ii) a hashed address scheme. The hashed address scheme being A(16bits): =CRC16(RA(48bits)||TA(48bits)), whereby the A denotes the Addressing field in the Short SSW frames, RA and TA both denote the addressing field inherent within 11ad SSW frames, and CRC16 denotes the CRC 16-CCITT.

The results of the calculations are presented in the table of FIG. 9A for the hashed addressing scheme and in the table of FIG. 9B for the 16 bit dual AID scheme in which n represents the number of STA's, and b represents the number of overlapping BSSs. These results are plotted in the graphs presented in FIGS. 10A to 10D where it can be seen that the 16 bit dual AID scheme is preferable to the hashed address scheme. The difference is particularly strong in the lower density OBSS and the higher density of stations per BSS scenarios.

Figure 11B:
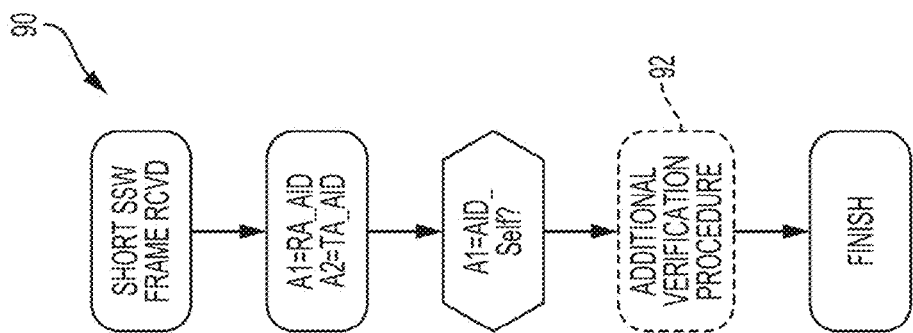
FIG. 11A presents a decoding sequence for the hashed addressing field format and FIG. 11B presents a decoding sequence for a dual AID addressing field format.
Figure 11A:
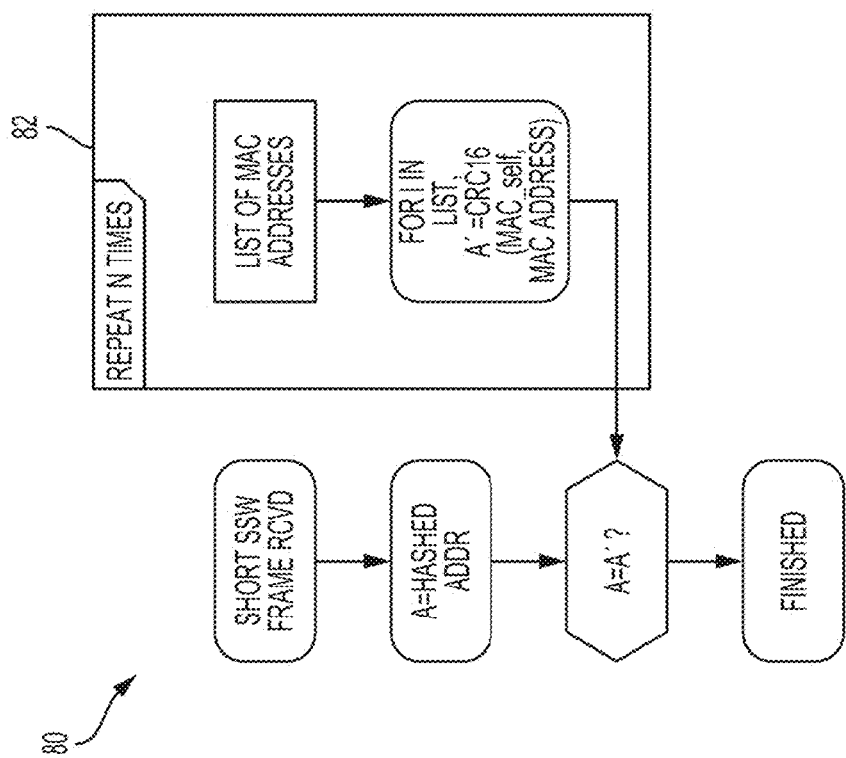

The selection of the addressing scheme can also influence decoding efficiency. Indeed, an example decoding sequence 80 with the hashed address scheme is shown in FIG. 11A, and an example decoding sequence 90 with the dual AID scheme is shown in FIG. 11B. The hashed address scheme 80 consumes more time in hashing and matching 82 (the repeat N times box), and the time complexity can generally be linearly dependent on the size of the List of MAC addresses O(N). The dual AID scheme decoding sequence 90 is comparatively more straightforward, and can require less time. In the dual AID scheme 90, an additional verification procedure 92 can additionally be used to perform the identification. For instance, fields other than the RA AID and TA AID fields (such as BSS ID for instance) can be checked.

The AP can be instructed to assign a fixed AID to itself. For instance, in 11ad, the following rules can govern the assignment of association IDs by the AP :

1-254 are assigned to STAs 14, 14';
0 is assigned to the AP 12;
255 is assigned to broadcast address.

It will be understood that in this embodiment, there is a non-zero false positive probability for the AP AID when the AP AID is fixed to 0 and operating in the OBSS. Indeed, an indication of false positive probability in such a context can be obtained by adapting the calculations presented above to an 8 bit context instead of 16 bit context.

It was found that the latter false positive probability could be reduced, at least in some scenarios, by assigning a distinctive AP AID. An AP's AID can be 'distinctive' if it has a probability of being different than the AIDs of other APs in OBSS. A distinctive AP AID can be assigned in a manner for the AP AIDs to have a suitably high probability of being different between different APs in OBSS. A distinctive AP AID can have a relatively high probability (e.g. above 0.5) of being non-zero. For instance, the AP can be instructed to assign a random AID to itself. Alternately, the AP can be instructed to assign an AID to itself based on a hashing scheme such as a coloring scheme, for instance. A coloring scheme can be based on the BSS ID (48 bit), for instance.

In still another embodiment, the AP can be instructed to use a specific distinctive portion of consecutive bits of an existing value, such as the 8 MSBs or the 8 LSBs of the BSS ID, for instance, as the AP AID. In each one of these latter examples, the AP AID can be considered distinctive AP AID as compared to the fixed AID scenario, such as the one in which all AP AIDs are set to zero. Indeed, this can result in a significantly lower probability of generating a same AID for two or more APs in OBSS, and thus reduce the risk of collision in OBSS.

Figure 8A:
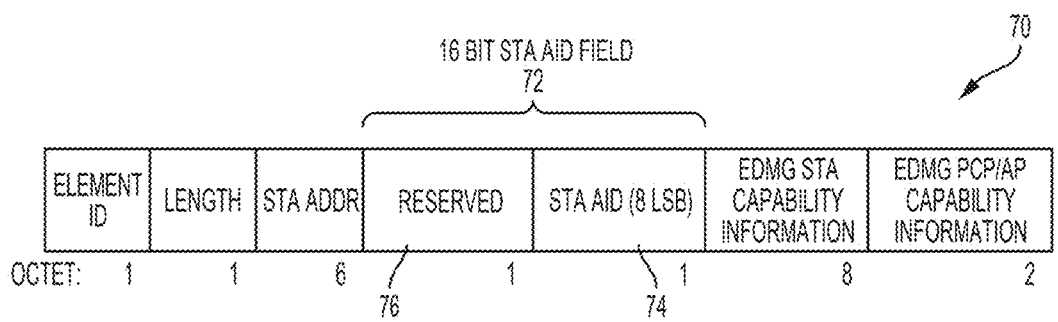
FIG. 8A is an example capability information element.
Figure 8B:
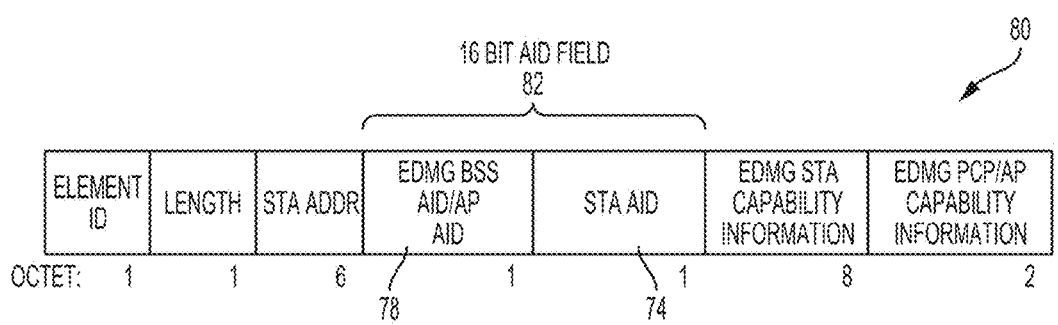
FIG. 8B is an example capability information element which is used to communicate the AP AID from the AP to the A-STA.
Figure 10A:
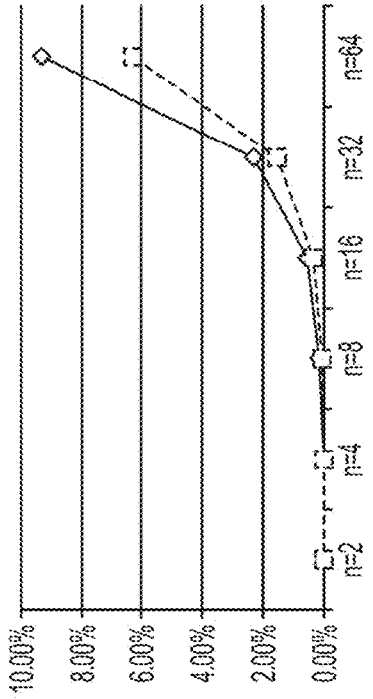
FIGS. 10A to 10D present the values of the tables of FIG. 9A and 9B in graphical form.
Figure 10B:
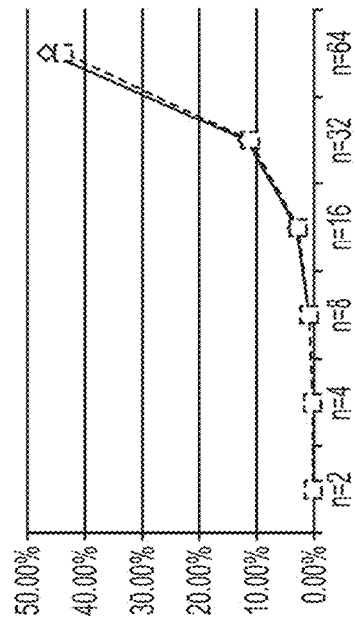
Figure 10C:
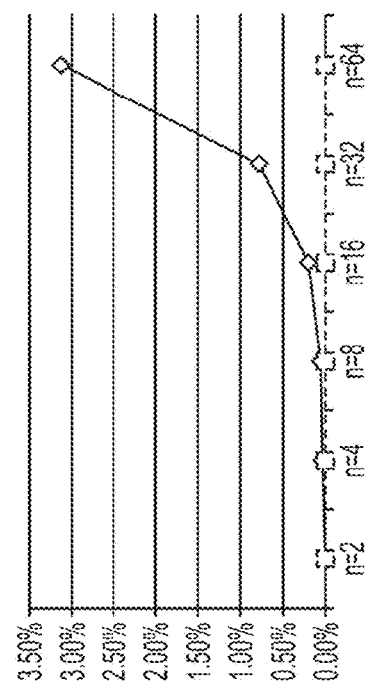
Figure 10D:
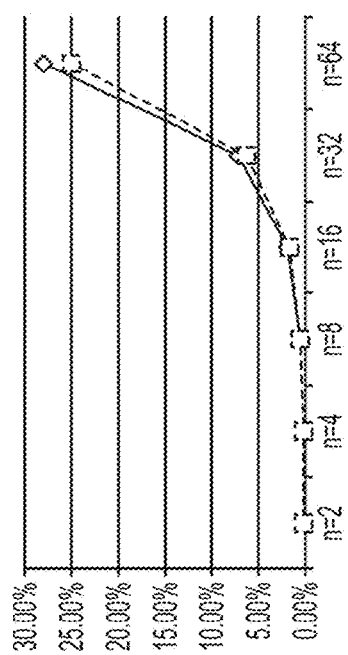

It was found that such a value generated by the AP can have other uses in addition to the one presented above in the context of short SSW. For instance, in DMG, an capability information element 70 having 16 bits for an AID field could be used for the STA AID. However, only the 8 LSBs were used for the STA AID, with the 8 MSBs being reserved for EDMG. This 8 MSBs of this AID field can be harnessed by filling them with the distinctive value of the AP AID as shown in FIG. 8B, which can be referred to as the EDMG BSS AID 78 in this context. Once received by the STA, the EDMG BSS AID 78 can be used for any suitable uses, which can be other than the short SSW frame format.

It was found that it could be useful direct the AP to assign a non-zero value to EDMG BSS AID. It was also found that it could be useful to use a non-zero EDMG BSS AID which has a high probability of being different from the EDMG BSS AID of other APs in OBSS. It can be useful to have the AP generate a single value which can then be used both as the AP AID for short SSW, and also as the EDMG BSS AID for any other suitable use. Under the current standard, both these values have 8 bits. This EDMG BSS AID/AP AID value can be communicated from the AP to an STA during the process of association of the STA, or at any other suitable time, for instance. Accordingly, the AP AID used in the context of short SSW presented above can be referred to as the EDMG BSS AID.

Accordingly, the EDMG BSS AID can be randomly (e.g. pseudo-randomly) generated by the AP, or can be a distinctive value. The EDMG BSS AID value can be filled in the 8 MSBs of the 16 bit AID field 82. The AP can be directed to fill the 8 MSBs of the 16 bit AID field with the distinctive EDMG BSS AID 78 value.

When an A-STA starts short SSW SLS, it can use the EDMG BSS AID as the AP AID (i.e. as RA AID or TA AID) in the short SSW frame format. More specifically, the A-STA can construct the short SSW frame by filling the addressing field 68 with the 16 bit AID field 82 for instance.

Alternately, the distinctive value of the EDMG BSS AID can be used by the STA for uses other than SLS, and not be used as the AP AID during SLS, for instance.

There are various ways in which the AP AID/EDMG BSS AID can be communicated from the AP to the STA. A first example is to include the AP AID as part of an EDMG capability information element 80, such as the one shown in FIG. 8B. The EDMG capability information element 80 can, for instance, be appended to (e.g. be 'piggybacked') over the DMG beacon, in the context of BTI 42.

Other examples of possible ways of communicating the AP AID/EDMG BSS AID can include :
  a) Being otherwise sent over the DMG beacon;
  b) Via an Association or Re-association Response Frame (a management frame in which it can be included in an EDMG Capability Information Element 82 or another element, for instance);
  c) Via a Grant Acknowledgement Frame (a management frame);
  d) Via a Probe Response Frame (a management frame);
  e) Via an Extended Scheduling Element (an Extended Scheduling Element is an Information Element which can be piggybacked to any suitable management frame);
  f) Via a Multiple BSSID Element (a Multiple BSSID Element is an Information Element which can be piggybacked any suitable management frame);
  g) Via a Nontransmitted BSSID capability element (another Information Element which can be piggybacked to any suitable management frame); and
  h) Via DMG BSS Parameter Change element (still another Information Element which can be piggybacked to any suitable management frame).

Referring back to FIG. 11B, a decoding sequence 90 with the dual AID scheme can optionally include an additional verification procedure 92. The additional verification procedure 92 can be used to further reduce the probability of collision. The additional verification procedure 92 can involve use of the short SSW feedback field 75 (FIG. 7) for instance. The additional verification procedure 92 can involve providing additional randomness. For instance, during initiator sector sweep (ISS), or unicast frames, the short SSW feedback field 75 can be reserved for validation of 10 bits of shortened BSS ID. More generally, if the short SSW feedback field 75 was not being used, it can be used in the context of this disclosure to add other information such as sector ID, BSS ID information, etc.

As can be understood, the examples described above and illustrated are intended to be exemplary only. The scope is indicated by the appended claims.

What is claimed is:

1. A method of beam forming by a first station, the process comprising :
    receiving, at the first station, a first plurality of short sector sweep (short SSVV) frames transmitted in sequence from a plurality of antenna sectors of a second station, and transmitting, in sequence, a second plurality of the short SSW frames to the second station, the second plurality of short SSW frames having an addressing field format including a first portion specifying a receiver address association ID (RA AID) and a second portion specifying a transmitter address association ID (TA AID);
    wherein the addressing field format of the second plurality of short SSW frames has a length that is shorter than a sum of: a length of a transmitter address and a length of a receiver address in a SSW frame.

2. The method of claim 1 wherein a comparison of the RA AID or the TA AID with a previously attributed AID of the first station can be used in a determination of the AID of the first station.

3. The method of claim 1 wherein the first station is a non-AP station, and the second station is also a non-AP station, and wherein both the first station and the second station are associated to an AP station in a basic service set (BSS).

4. The method of claim 1 wherein the RA AID and the TA AID each have a length of 8 bits.

5. The method of claim 1 wherein when the second station is a user equipment and the first station is an access point (AP), said method further comprising, prior to performing the SLS process, the AP communicating a station address association ID (STA AID) upon association with the AP, and using the STA AID as the RA AID or the TA AID depending on whether the user equipment is receiving or transmitting, respectively, during a given step of the SLS process.

6. The method of claim 5 further comprising the AP communicating an AP address association ID (AP AID) upon said association, and receiving the AP AID as the other one of the RA AID and TA AID when performing the SLS process with the UE.

7. The method of claim 6 wherein the AP communicates the AP AID in the form of an EDMG BSS AID within a EDMG Capability information element.

8. The method of claim 6 wherein the AP communicates the AP AID in an 8 bit field provided immediately adjacent to an 8 bit field of the STA AID.

9. The method of claim 6 wherein the AP communicates the AP AID during association with the UE.

10. The method of claim 6 wherein the AP communicates the AP AID during beamforming.

11. The method of claim 9 wherein the AP communicates the AP AID during a beacon transmission interval.

12. The method of claim 1 wherein when the second station is an access point (AP), the method comprising, prior to performing the SLS process, the first station receiving a distinctive address association ID (AP AID) assigned by the AP to itself, and using the AP AID as the RA AID or the TA AID depending on whether the AP is receiving or transmitting, respectively, during a given step of the SLS process.

13. The method of claim 12 wherein the AP AID is randomly generated and is stored in a field of the AP AID in a memory of the AP.

14. The method of claim 12 wherein the AP AID is generated using a hashing scheme and is stored in a field of the AP AID in a memory of the AP.

15. The method of claim 14 wherein the hashing scheme is a coloring scheme based on a BSS ID of the AP.

16. The method of claim 12 wherein a copy of a distinctive portion of a BSS ID is stored in a field of the AP AID in a memory of the AP.

17. The method of claim 12, further comprising, prior to performing the SLS, the first station receiving an address association ID (STA AID) assigned to the first station by the AP, the AP AID and the STA AID received as adjacent fields of a 16 bit AID field format.

18. The method of claim 12 further comprising, prior to performing the SLS, the first station receiving an address association ID (STA AID) assigned to the first station by the AP, and receiving the STA AID as the other one of the RA AID and the TA AID when performing SLS with the AP.

19. The method of claim 1 further determining that the second station is enabled with short SSW frame capability and selecting short SSW frame format instead of non-short SSW frame format for the SLS process with the second station.

20. The method of claim 19 wherein the first station is an EDMG station, and enablement of short SSW frame capability in the second station is contingent on whether the second station is an EDMG station.

21. The method of claim 1 wherein the short SSW frame format has 6 bytes and includes, 8 bits for RA AID, 8 bits for TA AID, 11 bits for CDOWN, 11 bits for short SSW feedback, 1 bit for direction, 1 bit reserved, and 4 bits for FCS.

22. A first station for beamforming comprising:
    a processor,
    a transceiver, and
    a memory having computer readable instructions for executing beamforming between a second station having a plurality of antenna sectors and the first station, including the steps:
    as part of a sector level sweep (SLS) process, receiving, in sequence, a first plurality of short sector sweep (SSVV) frames from the second station using corresponding ones of the antenna sectors, and
    transmitting, in sequence, a second plurality of the short SSW frames to the second station, the second plurality of short SSW frames having an addressing field format including a first portion specifying a receiver address association ID (RA AID) and a second portion specifying a transmitter address association ID (TA AID);
    wherein the addressing field format of the second plurality of short SSW frames has a length that is shorter than a sum of: a length of a transmitter address and a length of a receiver address.

23. The method of claim 1, wherein the length of the addressing field format of the second plurality of short SSW frames is sixteen bits.

24. The first station of claim 22, wherein the length of the addressing field format of the second plurality of short SSW frames is sixteen bits.

25. The first station of claim 22, wherein RA AID and the TA AID each have a length of 8 bits.

* * * * *